(12) United States Patent
Aydt (10) Patent No.: US 6,347,691 B1
(45) Date of Patent: Feb. 19, 2002

(54) ARRANGEMENT FOR PREVENTING THE SQUEALING OF A DISK BRAKE

(75) Inventor: Günter Aydt, Backnang (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/561,907

(22) Filed: May 1, 2000

(30) Foreign Application Priority Data

Apr. 29, 1999 (DE) .......................................... 199 19 437
Sep. 3, 1999 (DE) .......................................... 199 42 040

(51) Int. Cl.⁷ .............................................. F16D 65/02
(52) U.S. Cl. .............................. 188/218 XL; 188/73.37
(58) Field of Search ............................. 188/78 A, 73.37, 188/218 XL (56) References Cited

U.S. PATENT DOCUMENTS

| 4,705,146 | A | * | 11/1987 | Tarter ........................ 188/73.1 |
| 5,139,117 | A | | 8/1992 | Melinat |
| 5,417,313 | A | | 5/1995 | Matsuzaki et al. |
| 5,735,366 | A | | 4/1998 | Suga et al. |
| 6,161,660 | A | * | 12/2000 | Suga et al. ............ 188/218 XL |
| 6,241,054 | B1 | * | 6/2001 | Von Sivers et al. ........ 188/73.2 |

FOREIGN PATENT DOCUMENTS

| DE | 24 58 048 A1 | 6/1976 |
| DE | 40 41 010 A1 | 7/1991 |
| DE | 195 07 102 A1 | 9/1996 |
| JP | 62-97329 | 6/1987 |

\* cited by examiner

Primary Examiner—Christopher P. Schwartz
(74) Attorney, Agent, or Firm—Crowell & Moring, LLP (57) ABSTRACT

In order to prevent squealing of a disk brake, the disk brake has a brake disk with friction rings having locally weakening section moduli which detune corresponding to the natural oscillation mode. As a result, the natural oscillation mode of the brake disk is changed to such an extent that brake squealing is avoided.

4 Claims, 7 Drawing Sheets

ARRANGEMENT FOR PREVENTING THE SQUEALING OF A DISK BRAKE

This application claims the priorities of German application Nos. 199 19 437.8, filed Apr. 29, 1999, and 199 42 040.8, filed Sep. 3, 1999, the disclosures of which are expressly incorporated by reference herein.

BACKGROUND AND SUMMARY OF THE INVENTION

The present invention relates to an arrangement for preventing the squealing of a disk brake including a particular brake disk, with friction rings, and brake linings. The brake linings have a partial circumference length which relates to an approximately mean circumference of the brake disk. An imposed natural oscillation mode of the brake disk with n-nodes is obtained. Slots are provided in the friction rings.

German Patent Document DE 195 07 102 A1 relates to a disk brake which is tuned such that squealing noises during a braking operation are eliminated or reduced by way of adjacent brake linings. This takes place by establishing a certain ratio of the brake lining length to the brake disk circumference.

German Patent Document DE 40 41 010 relates to an arrangement for preventing the squealing of a disk brake. In this arrangement, the friction linings, which consist of a semi-metallic or asbestos-free material, are pressed onto a disk rotor or onto a brake disk for carrying out braking. The rotor is divided such that the second order resonance frequency of the longitudinal oscillation of the rotor is larger than 15 kHz. Division of the disk rotor takes place by way of slots which are arranged on the inside and the outside of the rotor.

It is an object of the invention to provide a disk brake in which the occurrence of squealing noises is prevented by a detuning of the natural frequency mode of the brake system.

According to the invention, this object is achieved by providing the friction rings of the brake disk, in at least one surface area of at least one friction surface thereof, with a local weakening of the section modulus such that a detuning node oscillation which is unequal to a natural vibration mode of the brake disk can be achieved. The nodes are formed from the ratio n=u/L, wherein u is a median brake disk circumference and L is a partial circumference length of the brake linings. Additional advantageous characteristics are also claimed.

Principal advantages achieved by the invention include detuning the natural oscillation behavior of existing brakes in the event of a squealing action such that brake squealing is reduced or eliminated.

According to the invention, this is essentially achieved by having a local weakening of the section modules "W" in at least one surface area of the friction surfaces of the friction ring of a solid brake disk, or of the friction rings of an internally ventilated brake disk, such that a detuning natural oscillation, which is unlike the natural oscillation mode of the brake disk with the oscillation node "W", can be achieved.

The local weakening or weakenings of the section modulus in one or both friction rings of the brake disk preferably are provided by one or several slots which separate the friction ring or rings and extends or extend from the brake disk center to approximately the outer edge or edges of the friction ring or rings.

A resulting detuning of the natural oscillation mode of the brake disk is provided by correspondingly arranged and dimensioned slots in both friction rings or in one friction ring in order to achieve locally reduced section moduli in one or several areas of the friction rings of the brake disk.

According to one embodiment of the invention, the slots may be arranged between the cooling ducts of the brake disk as well as on the ribs. Furthermore, the slots may be provided in the outer friction ring as well as in the inner friction ring or in both friction rings. In addition, the slots can also be provided in an alternating sequence in the outer and the inner friction rings.

Since each of the slots may separate parts of the friction rings, special links may be required by way of ribs, such as double ribs, which are situated closely side-by-side. When the brake rings have opposed slots, the ribs, which are situated side-by-side, are connected with one another by way of a transverse web.

According to the invention, the courses of the slots in the friction rings can be adapted to the courses of the ribs of the cooling ducts so that radial and diagonally extending slots are used which extend on the rib as well as between the ribs. It is also conceivable to arrange slots oppositely diagonally to the ribs and so as to cross over the ribs.

If a slot is arranged in the rib of the cooling duct, a wide rib is usually required so that the rib still results in sufficient stiffness. The number of ribs which are wider than the other ribs is selected corresponding to the requirements for preventing brake squealing. Thus, one wider rib or several wider ribs may be required. The width of the slot should be as narrow as possible so that the brake disk is not stressed by unnecessary rubbing effects. For this reason, it is also advantageous for the slot to have chamferings in the friction surface of the brake disk.

In every case, a locally reduced section modulus on the brake disk or in the friction rings achieves a detuning of the original natural oscillation mode of the brake disk. The local reduced section modulus achievable by the slots is preferably arranged at the same mutual distance and is designed unequal to the modes of the natural oscillation mode so that, for example, with a six-node oscillation, weakening of the brake disk occurs at four points.

Embodiments of the invention are illustrated in the drawings and will be described in detail.

DESCRIPTION OF THE PREFERRED EMBODIMENTS

Figure 1:
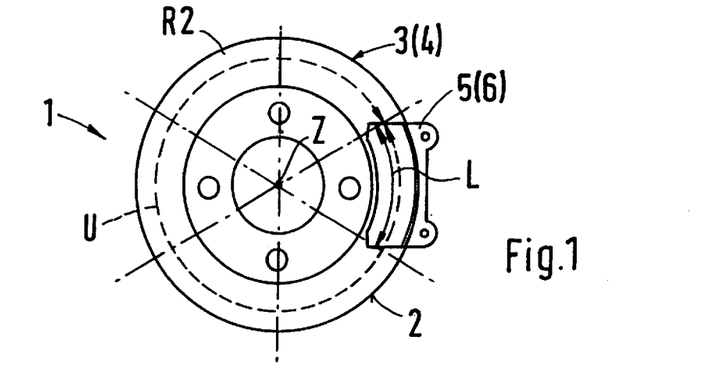
FIG. 1 is a schematic representation of a brake having a brake disk, a friction ring and brake linings.
Figure 2:
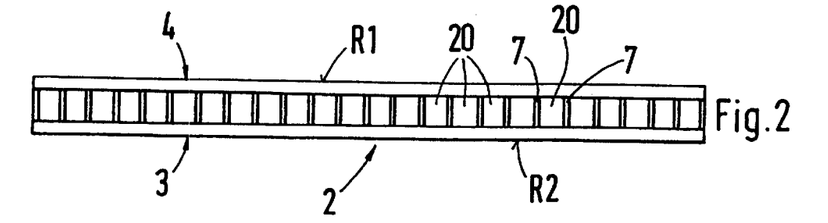
FIG. 2 is a view of an internally ventilated brake disk with a uniform section modulus as seen along the circumference of the brake disk.
Figure 3:
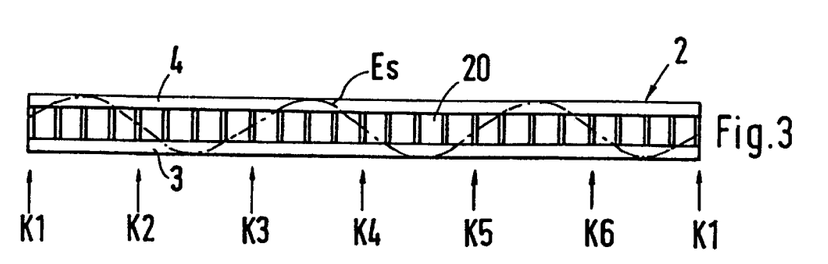
FIG. 3 is a view of an internally ventilated brake disk with an imposed oscillation mode with n-nodes (six nodes)
Figure 4:
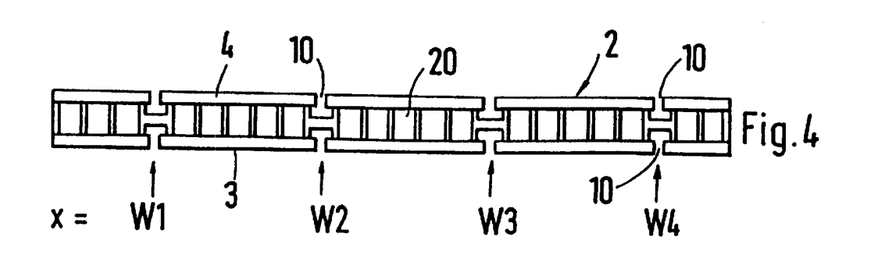
FIG. 4 is a view of an internally ventilated brake disk with locally reduced section moduli W1 to Wn at x-points.

A disk brake 1 is schematically illustrated in FIG. 1 and comprises essentially an internally ventilated brake disk 2 with two friction rings 3, 4. The friction rings have friction surfaces R1 and R2 on the outsides, which friction surfaces R1 and R2 can be acted upon by brake linings 5, 6. These brake linings 5, 6 are held in a caliper and can be displaced by way of a brake piston or brake pistons. Between the two friction rings 3, 4, cooling ducts 20 are formed between the ribs 7 which connect the two friction rings 3, 4 with one another. In each of FIGS. 2 to 5, the brake disk 2 is illustrated along the circumference U, so that a natural oscillation mode Es, a detuned oscillation mode Vs, and the locally reduced section moduli W1 to Wn with the defined oscillations of the brake disk 2 which can be achieved therefrom, can be shown.

The natural oscillation form Es of the brake disk 2 is essentially a function of the ratio of the approximately median brake disk circumference U to the brake lining length L. This means that when the brake disk circumference U is, for example, n=6 times as large as the lining length L, a natural oscillation mode Es, also with six nodes K1 to K6, is imposed on the brake disk, as illustrated in detail in FIG. 3.

In the particular case of existing brake systems, and in other cases, the brake disk circumference U as well as the lining length L can no longer be changed. In these cases, so that a significant influence can be achieved with respect to the noise behavior (squealing action), a detuning of the brake system is to be achieved with respect to its original natural oscillation mode Es.

A brake system, in the squealing condition, describes a sixnode oscillation ("n=6"). If the noise behavior is to be optimized in such a brake system, optimization takes place by using a brake disk which is changed with respect to the section modulus. On the basis of its construction, this brake disk is forced to carry out a different oscillation mode; that is, the local section moduli "x=W1 to Wn" (FIG. 4) of the brake disk 2 are unequal to the nodes "n=K1 to K6" of the natural oscillation mode "Es" of the brake disk 2. This permits a detuning of the brake system because the section modulus of the brake disk 2 is weakened in a targeted manner, whereby "x" is unequal to "n" in every case.

Figure 5:
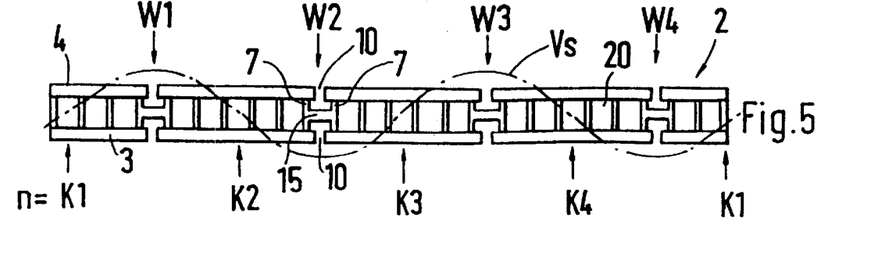
FIG. 5 is a view of the internally ventilated brake disk according to FIG. 4 with a detuned natural oscillation mode Vs.

FIG. 5 illustrates the natural oscillation mode Es of a brake disk 2 with a locally reduced section modulus W1 to Wn. The position of the reduced section modulus W1 to Wn in the brake or friction rings 3, 4 occurs as a result of the selection of the number "x" of the locally weakened section moduli W1 to Wn (for example, x=4), as in the following.

The locally reduced section moduli W1 to Wn are formed by slots 10 in the first friction ring 3, the second friction ring 4, or both of these friction rings. According to one embodiment, the slots 10 separate the brake ring 3 and/or 4 so that, at "x=4", four partial segments S1 to S4 are obtained.

FIGS. 6 to 10 illustrate several embodiments having various arrangements of the slots 10. Locally reduced section moduli "W1 to Wn" corresponding to the natural oscillations for "Es" and the resulting modes "K" are obtained; such is illustrated, for example, in FIG. 9 by way of five segments S1 to S5.

Figure 6:
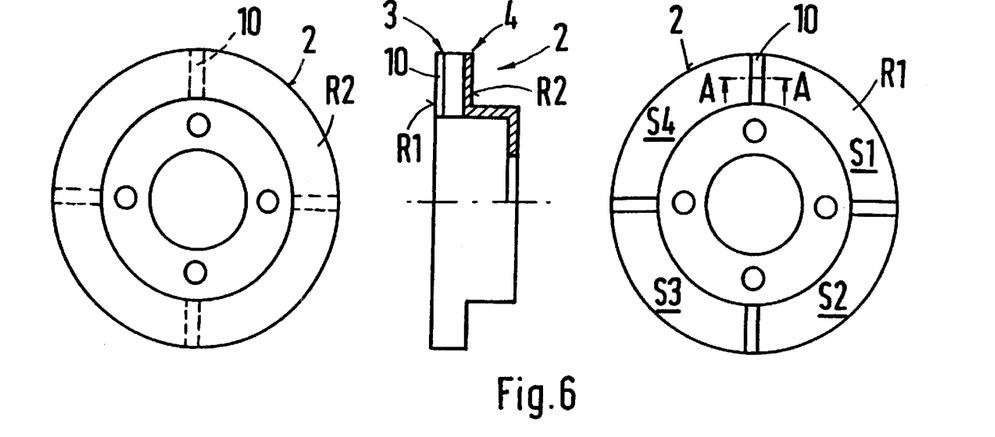
FIG. 6 is a view of a brake disk with four slots in the internal brake ring.
Figure 7:
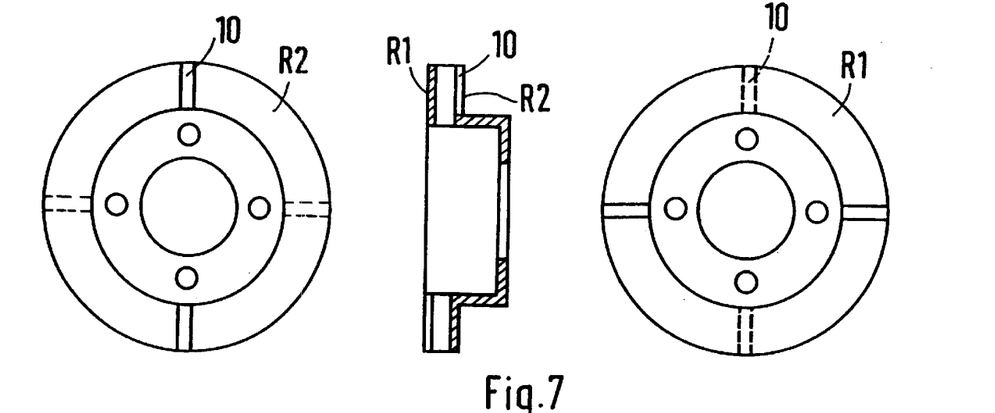
FIG. 7 is a view of a brake disk with four alternating slots in the outer and inner brake rings.
Figure 8:
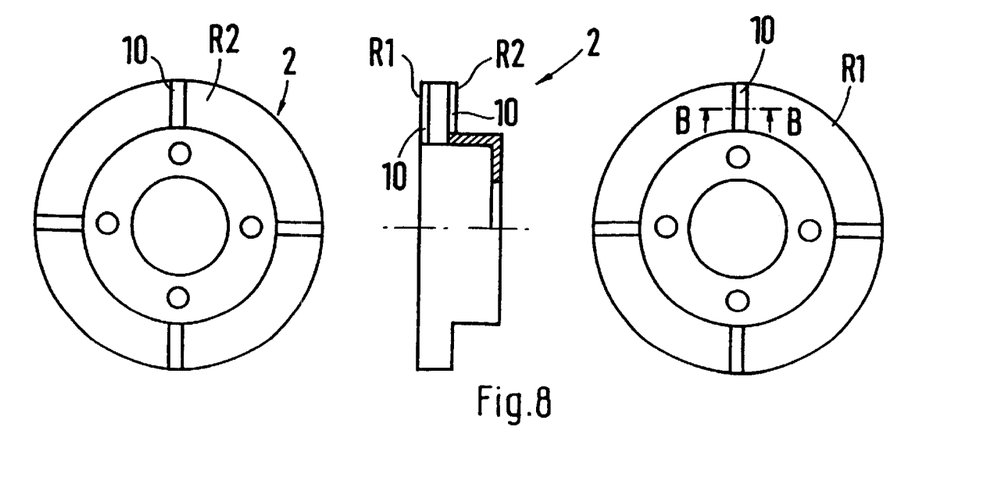
FIG. 8 is a view of a brake with opposed slots in the inner and outer brake rings.
Figure 9:
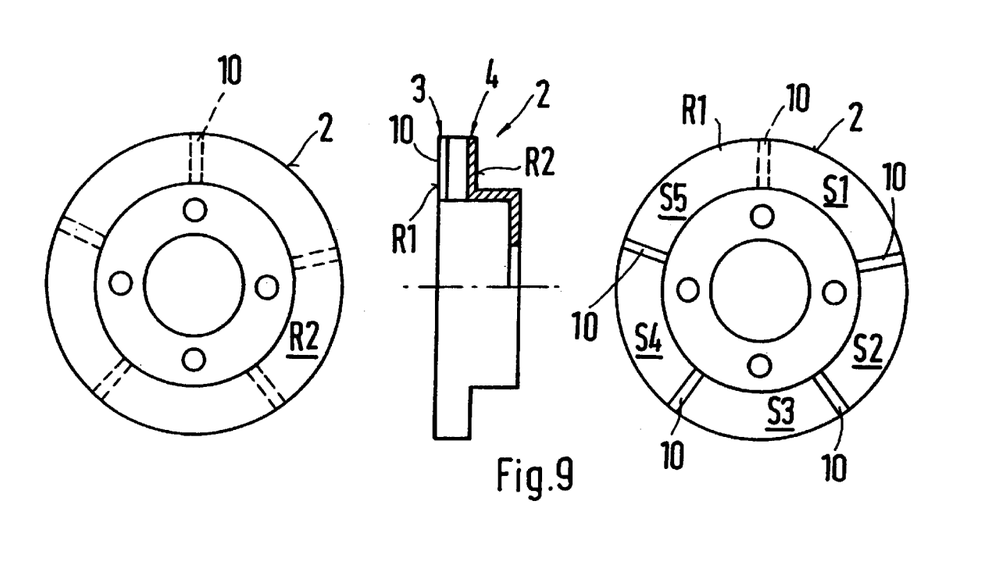
FIG. 9 is a view of a brake disk with, for example, five slots in the inner brake ring.

According to FIG. 6, the slots 10 are arranged in the inner friction ring R1; according to FIG. 7, the slots are arranged so as to alternate in the outer and inner friction rings R2, R1; and according to FIG. 8, the slots are arranged in both friction rings R1 and R2.

Arrangements of the slots 10 similar to those of FIGS. 6 to 8 can also be provided when "x=5" and with five segments S1 to S5.

Figure 10:
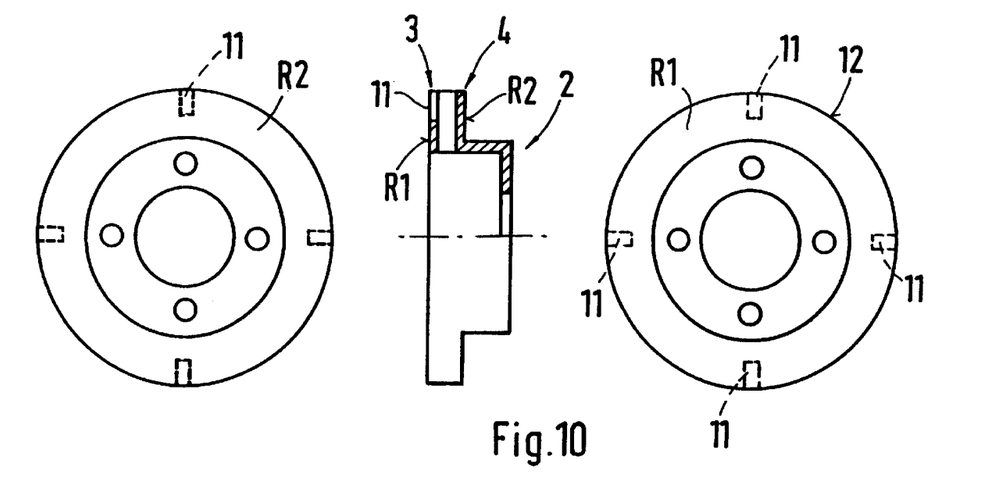
FIG. 10 is a view of a brake disk with radial partial slots in the inner brake ring.

According to another embodiment shown in FIG. 10, the inner friction ring, the outer friction ring, or both the inner and the outer friction rings R1 and R2 is or are provided with partial slots 11 which extend from the outer edge 12 radially toward the interior to the center Z and end approximately in the mean circumference U of the brake disk 2.

Figure 11:
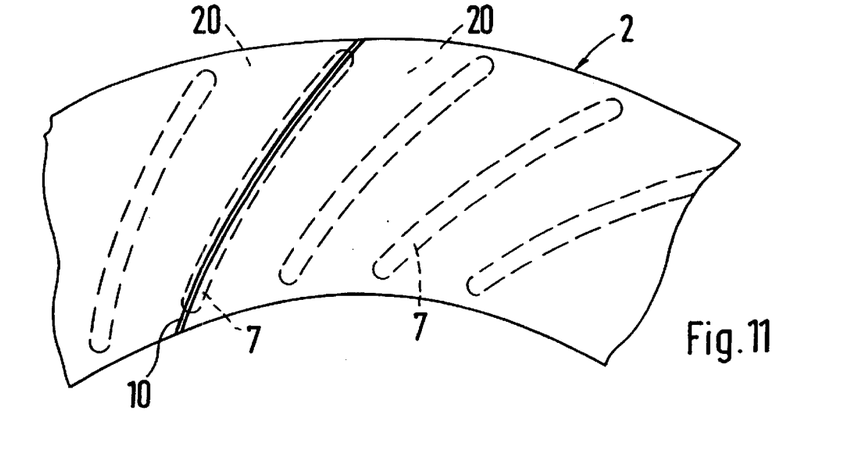
FIG. 11 is a view of a part of the brake disk with a slot in the brake ring on a bent rib of a cooling duct.
Figure 12:
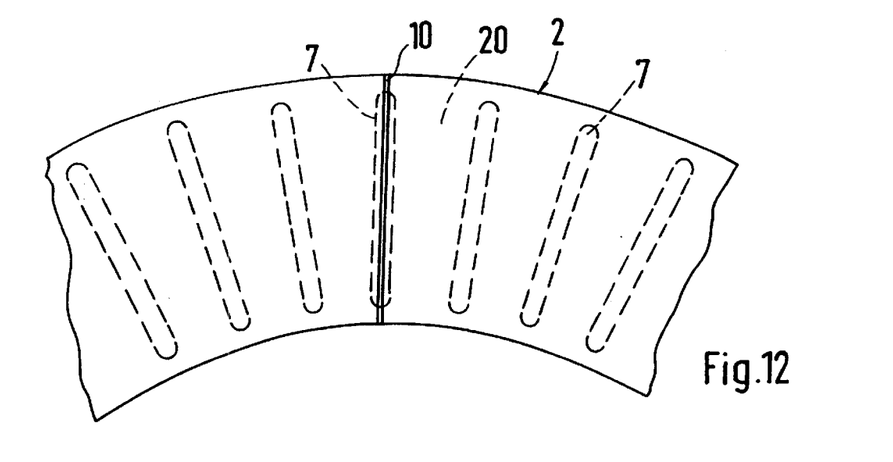
FIG. 12 is a view of a part of the brake disk with a slot in the brake ring on a radial rib of a cooling duct.
Figure 13:
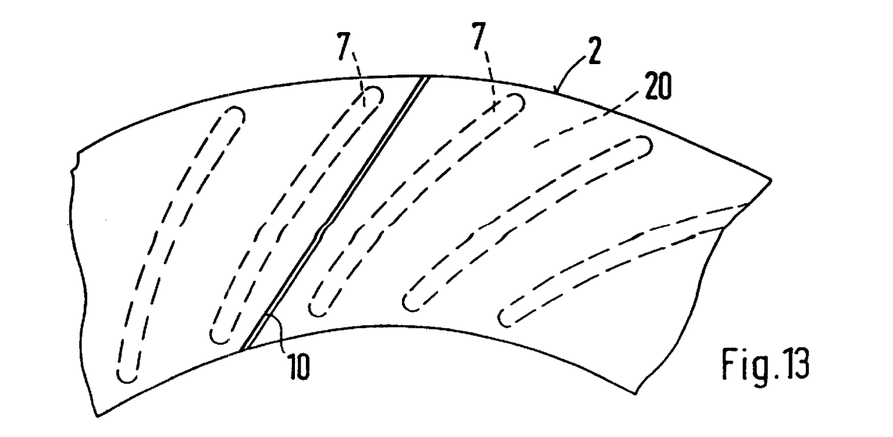
FIG. 13 is a view of a diagonally set slot in the brake ring between two diagonally extending or bent ribs of the brake disk.
Figure 14:
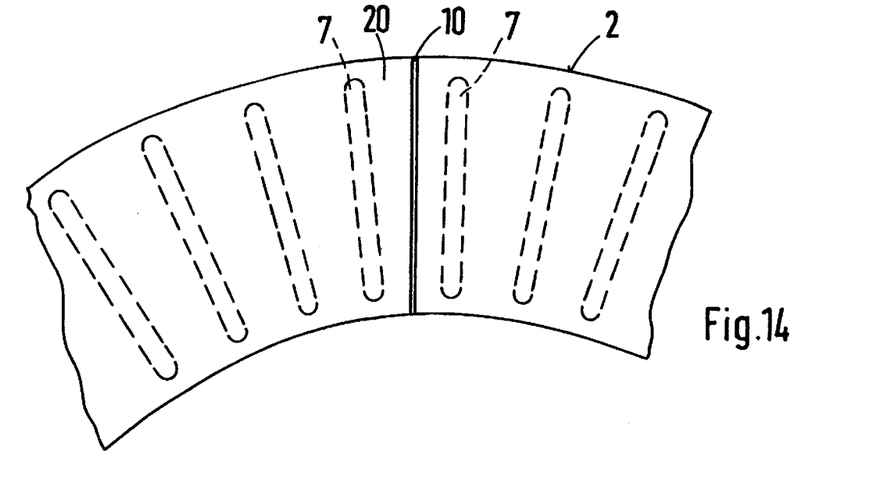
FIG. 14 is a view of a radially extending slot in the brake ring between two radially extending ribs.

FIGS. 11 and 12 show that the slots 10 can be arranged directly on the rib 7 of the cooling ducts 20 following their course. FIGS. 13 and 14 show that each slot can be arranged between the ribs 7 of the cooling ducts 20.

Figure 15:
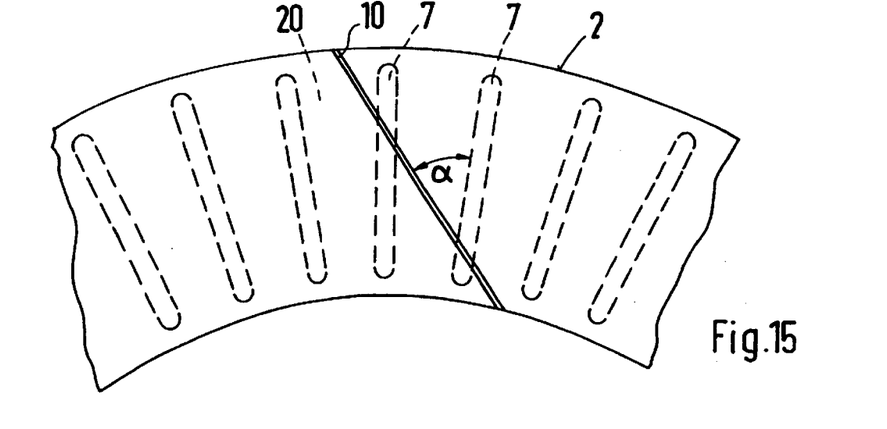
FIG. 15 is a view of a radially set slot which crosses the radial ribs of the cooling ducts.
Figure 16:
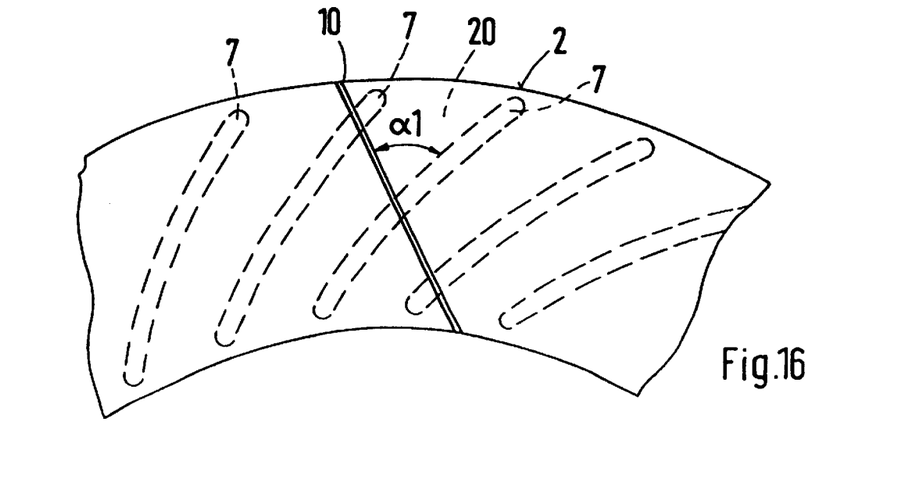
FIG. 16 is a view of a diagonally set slot which crosses the ribs of cooling ducts extending diagonally in arch shapes.

According to FIGS. 15 and 16, the slots 10 are set in the brake disk 2 at an angle α, α1 diagonally to the ribs 7. According to the invention, the slots 10 can also be arranged corresponding to the embodiment of FIGS. 6 to 10.

Figure 17:
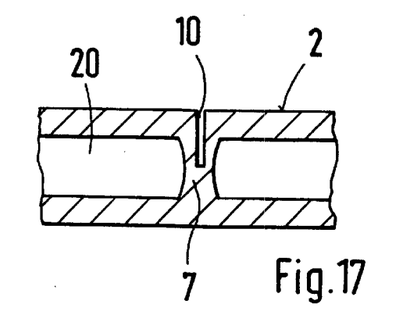
FIG. 17 is a view of an embodiment according to FIGS. 11 or 12 with a slot ending in the rib.

In an arrangement of the slot 10 on at least one of the ribs 7 of the brake disk 2, the rib can either be continuous or end in the center of the rib 7, as illustrated in detail in FIG. 17. Such an arrangement of the slots 10 can take place, for example, so as to alternate between the outer and inner friction rings R2 and R1.

Figure 18:
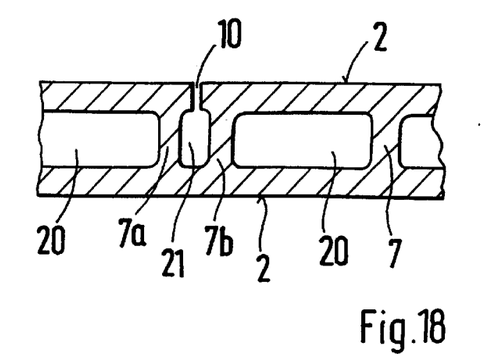
FIG. 18 is a view of another embodiment with a slot ending in a double rib.
Figure 19:
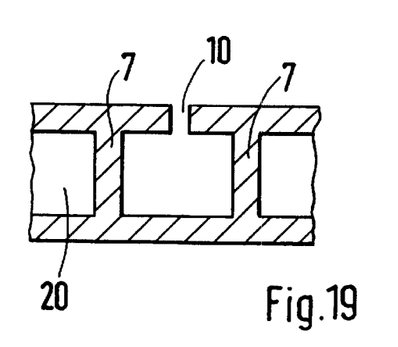
FIG. 19 is a sectional view of the brake disk of FIG. 6 along line A—A.
Figure 20:
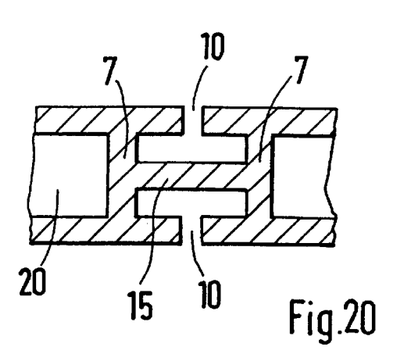
FIG. 20 is a sectional view of the brake disk of FIG. 8 along line B—B.

According to another embodiment of the invention according to FIG. 18, the slot 10 is arranged between two ribs 7a and 7b which are directly adjacent and form, between one another, a cooling duct 21 additional to the existing cooling ducts 20 between the ribs 7 of the brake disk 2.

In the case of an arrangement of the slots 10 according to FIG. 8 with opposed slots in the friction rings 3 and 4, the ribs 7 are connected with one another by way of at least one transverse web 15, as illustrated in detail in FIG. 5.

Figure 21:
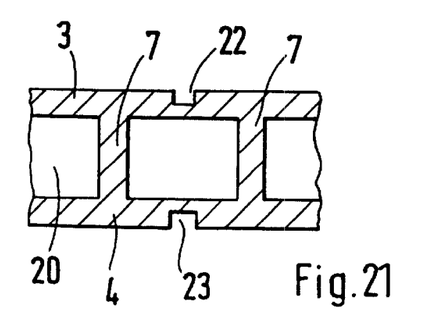
FIG. 21 is a sectional view of a brake disk having a groove in each friction surface of the friction ring.

According to the embodiment of FIG. 21, a reduced local section modulus is achieved by grooves 22 in the friction surfaces R1 and R2 in the brake rings which extend from the center Z to the outer edge 12.

Figure 22:
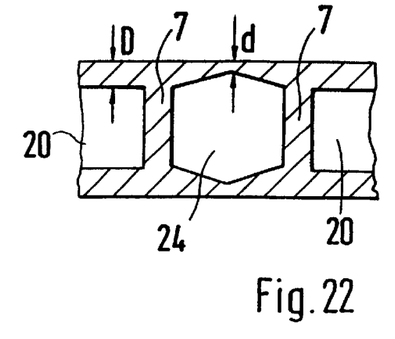
FIG. 22 is a view of another embodiment of a brake disk having an air duct with a hexagonal cross-section.

Furthermore, the reduced section modulus can also be achieved by at least one cooling duct 24 which is enlarged in its cross-section with respect to the surface in comparison to other cooling ducts 20. The wall d of the brake ring is smaller in the area of the cooling duct 24 than the wall thickness D in the area of the cooling duct 20.

Figure 23:
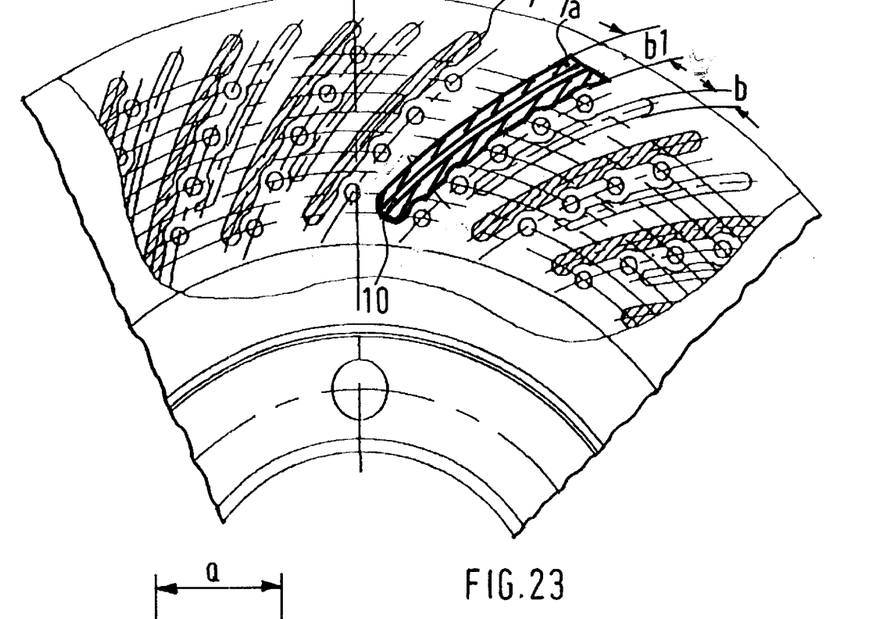
FIG. 23 is a top view of an internally ventilated brake disk with a wide rib having a slot and in which the friction surface is partially cut-open.
Figure 24:
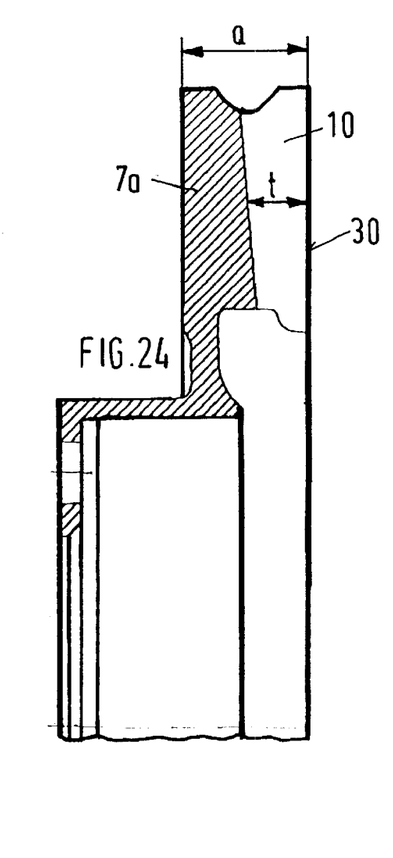
FIG. 24 is a sectional view of the internally ventilated brake disk in the area of the slot.
Figure 25:
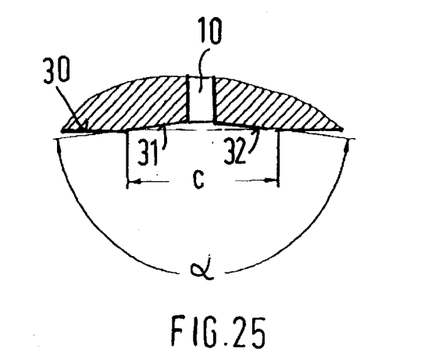
FIG. 25 is a sectional view of the friction surface of the internally ventilated brake disk with chamferings of the slot.

As illustrated in detail in FIGS. 11 and 12, the slot 10 is arranged approximately in the center of the rib 7. In this embodiment, the ribs 7 are all of the same width b. So that the slot 10 does not weaken the rib, according to another embodiment of FIGS. 23 to 25, a rib 7a with the measurement b1 is provided which is wider than the rib 7 and in which the slot 10 is arranged. The slot 10 preferably has a width of <2 mm, particularly of 1.4 mm, the depth t of the slot 10 extending approximately to half the brake disk thickness a. The slot 10 is provided, on both sides of the friction ring surface 30, with a chamfering 31, 32 having a width c and an angle α. The slot 10 may be arranged on the outer friction ring surface and/or on an inner friction ring surface. Five wider ribs 7a are preferably provided which are arranged to be uniformly distributed along the circumference.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. An arrangement for preventing squealing of a disk brake having a brake disk comprising:

brake linings which have a circumferential lining length in a relationship with an approximately median circumference of the brake disk by which an imposed natural oscillation mode of the brake disk with n-nodes is obtained, inner and outer friction rings of the brake disk which include at least one slot provided in at least one surface area of the friction rings to produce a local weakening of a section modulus so that a detuning node oscillation, which is unequal to the natural oscillation mode of the brake disk, can be achieved, the at least one slot extending in a direction from the brake disk center to approximately an outer edge of the brake disk, and ribs connecting the inner and outer friction rings and forming cooling ducts, wherein said at least one slot is arranged in the surface area so as to extend on at least one of the ribs forming the cooling ducts, penetrate the at least one surface area of the friction rings, and end in the at least one of the ribs.

2. The arrangement according to claim 1, wherein said at least one slot is arranged only in the inner friction ring.

3. The arrangement according to claim 1, wherein said at least one slot is arranged only in the outer friction ring.

4. The arrangement according to claim 1, wherein said at least one slot is one of a plurality of slots arranged in an alternating manner in the inner and outer friction rings of the brake disk.

* * * * *